(12) United States Patent
Motoyama et al.

(10) Patent No.: US 6,421,608 B1
(45) Date of Patent: Jul. 16, 2002

(54) METHOD AND SYSTEM OF REMOTE POSITION REPORTING DEVICE

(75) Inventors: Tetsuro Motoyama, Cupertino; Avery Fong, Castrol Valley, both of CA (US)

(73) Assignee: Ricoh Company Limited, Tokyo (JP)

( * ) Notice: Subject to any disclaimer, the term of this patent is extended or adjusted under 35 U.S.C. 154(b) by 0 days.

(21) Appl. No.: 09/575,702

(22) Filed: Jul. 12, 2000

(51) Int. Cl.$^7$ .......................... G06G 7/78; G01S 21/00; G01S 7/19
(52) U.S. Cl. .................................. 701/213; 342/357.09
(58) Field of Search ...................... 701/23–26, 117–123, 701/200–201, 207–215, 300–301; 342/350, 352, 357.01–357.09, 357.12–357.13, 357.15–357.17, 358, 450–451, 457–458, 463–465; 709/310, 315–319, 328–330; 340/988–996

(56) References Cited

U.S. PATENT DOCUMENTS

| | | | | |
|---|---|---|---|---|
| 5,576,716 A | * | 11/1996 | Sadler | 342/357 |
| 5,959,577 A | * | 9/1999 | Fan et al. | 342/357.13 |
| 6,118,403 A | * | 9/2000 | Lang | 342/357.09 |
| 6,243,039 B1 | * | 6/2001 | Elliot | 342/457 |
| 6,263,280 B1 | * | 7/2001 | Stingone, Jr. | 701/213 |

OTHER PUBLICATIONS

U.S. application No. 09/575,702, filed Jul. 12, 2000, pending.
U.S. application No. 09/782,164, filed Feb. 14, 2001, pending.
U.S. application No. 09/782,083, filed Feb. 14, 2001, pending.
U.S. application No. 09/782,064, filed Feb. 14, 2001, pending.
U.S. application No. 09/782,187, filed Feb. 14, 2001, pending.
U.S. application No. 09/756,120, filed Jan. 09, 2001, pending.

* cited by examiner

Primary Examiner—William A. Cuchlinski, Jr.
Assistant Examiner—Thu Nguyen
(74) Attorney, Agent, or Firm—Oblon, Spivak, McClelland, Maier & Neustadt, P.C.

(57) ABSTRACT

A remote position monitoring system, method, and computer-program product using a global position satellite receiver and information from at least two global position satellites to determine a position of a mobile object with the global position satellite receiver and report via Internet the position of the mobile object to a recipient in search of the mobile object. A remote position reporting device of the monitoring system can be part of or attached to any mobile object such as a child, a skier, a car, and expensive items. The remote position reporting device includes a global positioning system (GPS) receiver, monitoring software and an Internet access module. The monitoring software (e.g., a dynamic link library) supports multiple data formats and multiple protocols to communicated the position information. The GPS receiver provides the monitoring software with position information at prescribed times, and the monitoring software records the position information. The monitoring software communicates the position information at prescribed times to a desired party through the Internet access module.

23 Claims, 12 Drawing Sheets

| Return Value | Function Name | Description |
|---|---|---|
| bool | getNextSession | Return false when there is no more session; true otherwise |
| string | getFileName | Returns file name for the EventData |
| map<string,string> | getSessionInformation | Returns the map. Keys are UserID ApplicationID, CumulativeSessionNumber, StartTime, and Duration. |
| map<string, vector<string>> | getSessionEventData | Returns the map. Keys are EventName and EventTiming. The values of EventTiming vector are in the unit of 10th of a second converted from unsigned integer to string. |

FIG. 6B

| Return Value | Function Name | Description |
|---|---|---|
| bool | getNextLine | Returns one line of string data as an out parameter string. The function returns true if there is a line; false if no more line exists with empty string. |
| string | getFileNameWithSuffix | returns file name for the data with suffix if applicable |

*FIG. 6C*

METHOD AND SYSTEM OF REMOTE POSITION REPORTING DEVICE

CROSS REFERENCE TO RELATED APPLICATIONS

The present application Ser. No. 09/575,702, is related to the following U.S. application and patents: Ser. No. 09/453,934 filed May 17, 2000; Ser. No. 09/453,935 filed May 17, 2000; Ser. No. 09/453,936 filed May 17, 2000; Ser. No. 09/453,937 filed May 17, 2000; Ser. No. 09/542,284 filed Apr. 4, 2000; Ser. No. 09/520,368 filed Mar. 7, 2000; Ser. No. 09/440,692 filed Nov. 16, 1999; Ser. No. 09/440,647 filed Nov. 16, 1999; Ser. No. 09/440,646 filed Nov. 16, 1999; Ser. No. 09/440,693 filed Nov. 16, 1999; Ser. No. 09/440,645 filed Nov. 16, 1999; Ser. No. 09/408,443 filed Sep. 29, 1999; Ser. No. 09/407,769 filed Sep. 29, 1999; Ser. No. 09/393,677 filed Sep. 10, 1999; Ser. No. 09/311,148 filed May 13, 1999; Ser. No. 09/192,583 filed Nov. 17, 1998; Ser. No. 09/190,460 filed Nov. 13, 1998, now U.S. Pat. No. 6,208,956; Ser. No. 08/883,492 filed Jun. 26, 1997; Ser. No. 09/108,705 filed Jul. 1, 1998; Ser. No. 09/107,989 filed Jul. 1, 1998; Ser. No. 08/997,482 filed Dec. 23, 1997, now U.S. Pat. No. 6,085,196; Ser. No. 08/997,705 filed Dec. 23, 1997, now U.S. Pat. No. 6,279,015; Ser. No. 08/738,659 filed Oct. 30, 1996; Ser. No. 08/738,461 filed Oct. 30, 1996; Ser. No. 09/457,669 filed Dec. 9, 1999; Ser. No. 08/916,009 filed Aug. 21, 1997; Ser. No. 07/902,462 filed Jun. 19, 1992, now abandoned; Ser. No. 07/549,278 filed Jul. 6, 1990, now abandoned; U.S. Pat. Nos. 5,908,493; 5,887,216; 5,818,603; 5,819,110; 5,774,678; 5,649,120; 5,568,618; 5,544,289; 5,57,554; and 5,412,779. The contents of each of those applications and patents is incorporated herein by reference.

BACKGROUND OF INVENTION

This invention generally relates to a method and system that can monitor and communicate positions of a mobile object by using a monitoring system, and more particularly to a method and system utilizing a software library to support multiple data formats and multiple protocols when communicating position information.

With the rise of chip technology, many devices (e.g., laptops) are getting smaller with higher capabilities. The mainframe computer of 30 years ago has less capability than current laptop computers. In addition, the advance of battery technology allows increased portability of various devices. The functions of the cellular phone also have been increasing, with some services now supporting Internet access through the cellular phone.

Technology continues to address many of today's problems. One current problem is finding a missing item (e.g., a stolen car) or a missing or distressed person. Tracking of vehicles such as automobiles and trucks is known. For example, Trimble Navigation Limited produces an array of products, including a global positioning system (GPS) by which data from mobile vehicles is sent via a wireless network at regular intervals to a centrally located base station to track the vehicles.

Tremendous effort (money and manpower) also can be expended when searching for a missing person without ever finding that person. "Personal Locator Services Emerge" by Hiroaki Koshima & Joseph Hoshen (IEEE Spectrum, February 2000, vol. 37, no. 2, pp. 41–48) (hereinafter "Koshima"), describes many implementations of a personal locator device, including those that use global positioning system (GPS), to locate the position of an individual with the device. The location of the individual with the personal locator device is obtained when a subscriber requests the individual's location through a location service provider or when the panic button on the device is pressed. The personal locator device communicates its location to the location service provider, and the information about the location of the individual is communicated to the subscriber. The system in Koshima utilizes a service center that has to be contacted by a requester to locate a missing subscriber (e.g., a patient suffering from dementia). Further, Layson, Jr. (U.S. Pat. No. 6,014,080) describes how global positioning system (GPS) data from a body worn active and passive tracking device is sent via a wireless network to a centrally located base station.

SUMMARY OF INVENTION

There is a need for a remote position reporting device which sends properly formatted GPS data from mobile objects via a wireless network to any specified party using appropriate data formats and communication protocols such that the recipient (i.e., the person(s) in search of the mobile object) can read the location of the mobile object without having to depend on a base station or a location service provider to give the position of the mobile object.

Accordingly, one object of the present invention is to provide methods to improve the chances of finding a mobile object by transmitting, from a position reporting device, GPS data location periodically to a recipient in search of the mobile object. By communicating information about the mobile object's position or positions directly to the recipient in search of the mobile object, there is a greater chance that the mobile object will be found.

Another object of the present invention is to provide a system for monitoring the position of a mobile object with a global positioning system (GPS) receiver, a monitoring system, and an Internet access module communicating the position directly to the recipient in search of the mobile object.

A further object of the present invention is to provide a system for communicating data obtained by monitoring the position of a GPS receiver to a remote recipient by transmitting data formats that ease the analysis of received data at the remote recipient.

The present invention achieves these and other objects by monitoring the positions of a remote position reporting device (e.g. a device including a GPS receiver) that can be part of or attached to any mobile object such as a child, a skier, a car and expensive items. In one embodiment, the obtained positions are collected, logged and communicated to a desired location by at least one of (1) a store-and-forward protocol (e.g., Internet e-mail) and (2) a direct-connection protocol (e.g., file transfer protocol (FTP)). The use of e-mail communication reduces the costs associated with communicating such data. The data can be communicated to the desired location at specified intervals. If necessary, direct connections between a monitored application and a monitoring system can be established in addition to, or instead of, the e-mail communication.

One advantage of the present invention is that the positioning information can be directed to the desired destination rather than to a central location. The present invention allows the location information of the subscriber to be directed to a home computer that may have mapping capability, showing the requester (1) where the subscriber is, (2) how quickly the subscriber is moving, and (3) in which direction the subscriber is moving. The system can likewise be used to track children coming home from school. Any abrupt departures from the path home could indicate that a monitored child is in trouble. With the present invention, there is no need to periodically contact a service center to determine the children's location, unless it is so desired.

Another application of the device of the present invention is to utilize the device on persons entering dangerous situations (e.g., adventurous skiers who are likely to go to dangerous spots). The locations of the skiers can be reported directly to a rescue team. Should an avalanche occur, the rescue team will know whether or not the skiers escaped the path of the avalanche and, of those who did not escape, how many are to be rescued.

It is another object of the present invention to mount a remote position reporting device on or within a vehicle (e.g., a bus, boat, train, or taxi) such that the reporting device sends the position of the vehicle to a monitoring device without user intervention. The position information can be used to periodically update an estimated time of arrival.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein:

FIG. 6B is an exemplary EventData class interface for use in the architecture of FIG. 6A;

FIG. 6C is an exemplary FormattedEventData class interface for use in the architecture of FIG. 6A;

DETAILED DESCRIPTION

Figure 1:
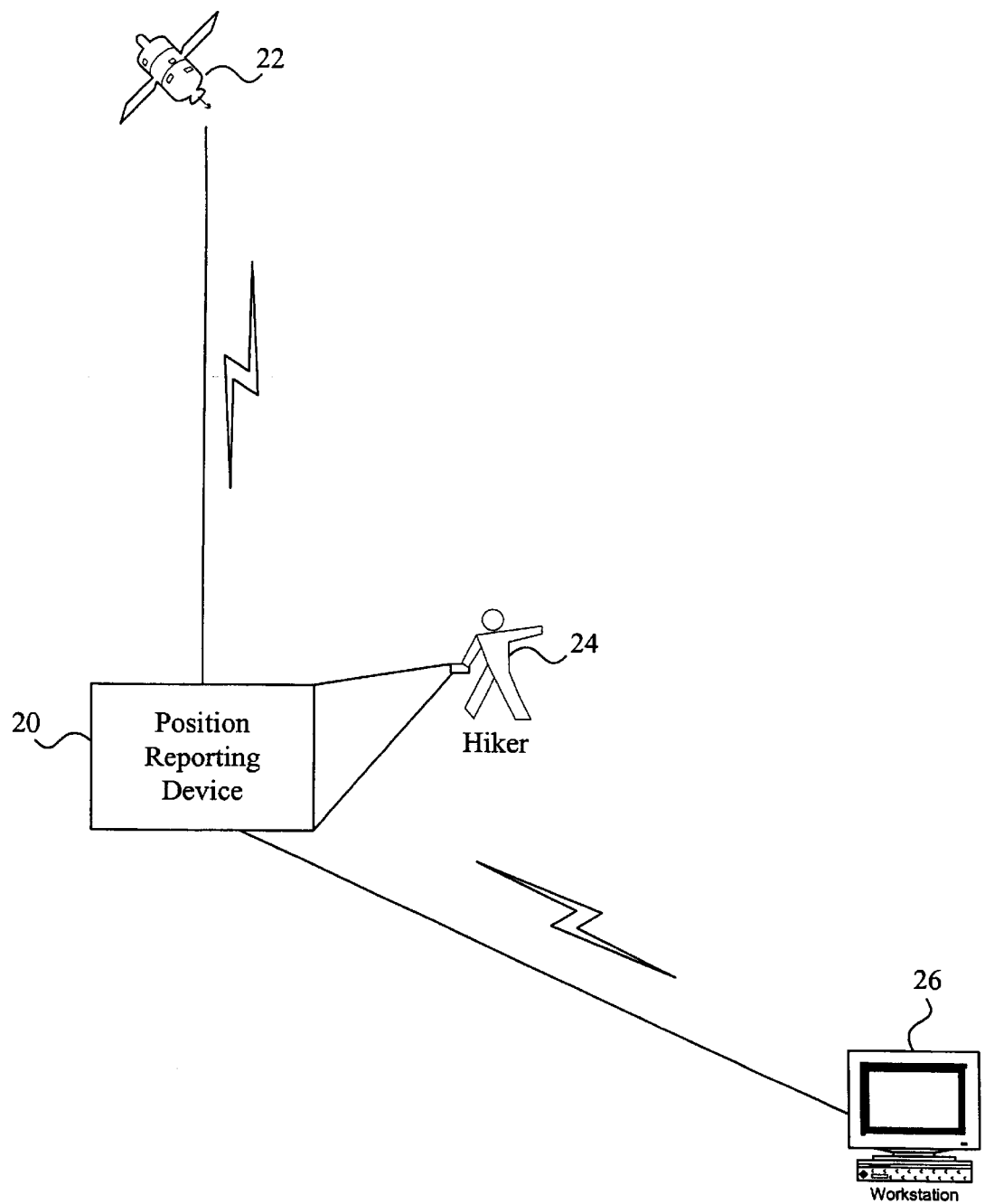
FIG. 1 illustrates the use of the position reporting device to send position information to a desired party.

Referring now to the drawings, wherein like reference numerals designate identical or corresponding parts throughout the several views, FIG. 1 illustrates a position reporting device 20 whose position is being monitored. As shown in FIG. 1, according to one embodiment a GPS satellite 22 of a larger GPS constellation transmits information to the position reporting device 20. The information is used by the position reporting device 20 to determine its own position. The position reporting device 20 can determine its own position using techniques such as those taught by Matsumoto (U.S. Pat. No. 5,210,540), Hwang (U.S. Pat. No. 5,021,792) (both incorporated herein by reference), or other techniques known in the GPS field that calculate positions from signals received from plural known locations (e.g., plural GPS satellites, plural ground stations, or a combination thereof). The position reporting device 20 may obtain the information continuously or periodically. The position reporting device 20 can be used to obtain the position of any mobile object (e.g., a hiker 24 (see FIG. 1), a child, a bike, a car, a pair of skis, a snowboard, a boat, or a hang glider). As would be appreciated, the position reporting device 20 may be affixed to (either permanently or temporarily) or placed inside any of the mobile objects, as necessary. The position information is (1) collected in the position reporting device 20 and (2) communicated to a desired party (e.g., using a store-and-forward or direct communication protocol) using wireless communication. In FIG. 1, the position information is communicated to a computer workstation 26. The user of the workstation 26 is provided information on the location of a mobile object (e.g., the hiker 24). If the object is missing, the user of the computer workstation 26 can use the position information communicated to it to provide information to a search team to quickly find the object.

Figure 2:
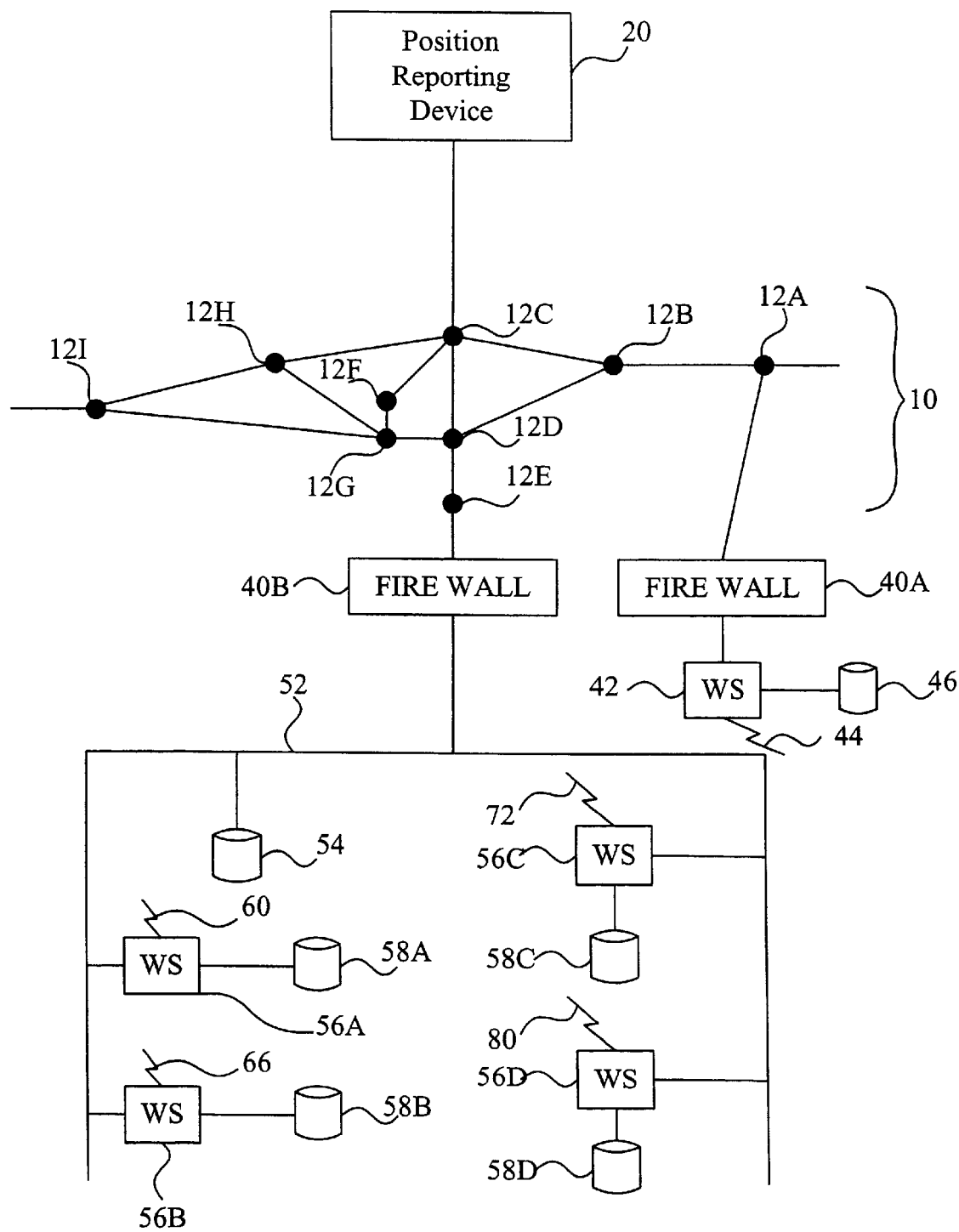
FIG. 2 illustrates a position reporting device connected to a network of computers and databases through a Wide Area Network (e.g., the Internet)

FIG. 2 illustrates a position reporting device 20 connected to a Wide Area Network (WAN) 10 via a wireless connection (e.g., using a radio frequency (RF) or infra-red (IR) transmitter or transceiver). The position reporting device 20 obtains signals from the GPS satellites and determines its own position. The position reporting device 20 collects position information and then communicates this information to a recipient. Wireless transceivers are commercially available from Ricochet Wireless, Sprint PCS Wireless, and RCN's Blackberry Wireless Email.

In FIG. 2, a wide area network (e.g., the Internet or its successor) is generally designated by 10. The WAN 10 can either be a private WAN or a public WAN. The WAN 10 includes a plurality of interconnected computers and routers designated by 12A–12I. The manner of communicating over a WAN is known through RFC documents available via the HTTP protocol at www.ietf.org/rfc.html. Transmission Control Protocol/Internet Protocol (TCP/IP) related communication is described in several references, including (1) TCP/IP Illustrated, Vol. 1, The Protocols, by Stevens, from Addison-Wesley Publishing Company, 1994, ISBN: 0201633469, (2) Internetworking with TCP/IP by Comer and Stevens, 4th edition, Vol. 1 (Apr. 15, 2000), Prentice Hall; ISBN: 0130183806, (3) Internetworking with TCP/IP, Vol. II, ANSI C Version: Design, Implementation, and Internals, by Comer and Stevens, 3 edition (Jun. 10, 1998) Prentice Hall; ISBN: 0139738436, and (4) Internetworking with TCP/IP, Vol. III, Client-Server Programming and Applications-Windows Sockets Version, by Comer and Stevens, 1 edition (Apr. 28, 1997) Prentice Hall; ISBN: 0138487146. The contents of all four books are incorporated herein by reference in their entirety.

In FIG. 2, a firewall 40B is connected between the WAN 10 and a network 52. Also, a firewall 40A is connected between the WAN 10 and a workstation 42. The firewall 40B is a device that allows only authorized computers on one side of the firewall to access a network or other computers on the other side of the firewall. Firewalls such as firewall 40A and 40B are known and commercially available devices and/or software and, for example, include SunScreen from Sun Microsystems Inc.

The network 52 is a conventional network and includes a plurality of workstations 56A–56D. In addition to the workstations connected via the network 52, there is a workstation 42 that is not directly connected to the network 52. Information in a database stored in a disk 46 may be shared using proper encryption and protocols over the WAN 10 to the workstations connected directly to the network 52. Also, the workstation 42 includes a direct connection to a telephone line and/or Integrated Services Digital Network (ISDN) and/or cable and/or wireless network 44, and the database in disk 46 may be accessed through the telephone line, ISDN, cable or wirelessly. The cable used by this invention may be implemented using a cable which typically is used to carry television programming, a cable which provides for high speed communication of digital data typically used with computers or the like, or any other desired type of cable. The workstations 42 and 56A–56D that are connected to the WAN provide a secure connection to the position reporting device 20. This allows the position reporting device 20 to properly communicate its position information to any of the workstations 42 and 56A–56D. Devices 58A–58D are data storage devices.

A feature of the present invention is the use of a "store-and-forward" mode of communication (e.g., Internet e-mail) or transmission between the position reporting device 20 and a workstation for monitoring the position information. The "store-and-forward" process avoids the position reporting device 20 from having to wait until a direct connection is established with the recipient. Because of network delays, the communication could take a substantial amount of time during which the application would be unresponsive. Such unresponsiveness can be unacceptable to the recipient, if for example, one is tracking the motion of the position reporting device 20. By using e-mail as the store-and-forward process, retransmission attempts after failures occur automatically for a fixed period of time. Alternatively, the message that is transmitted may be implemented using a mode of communication that makes direct, end-to-end connections.

Figure 3:
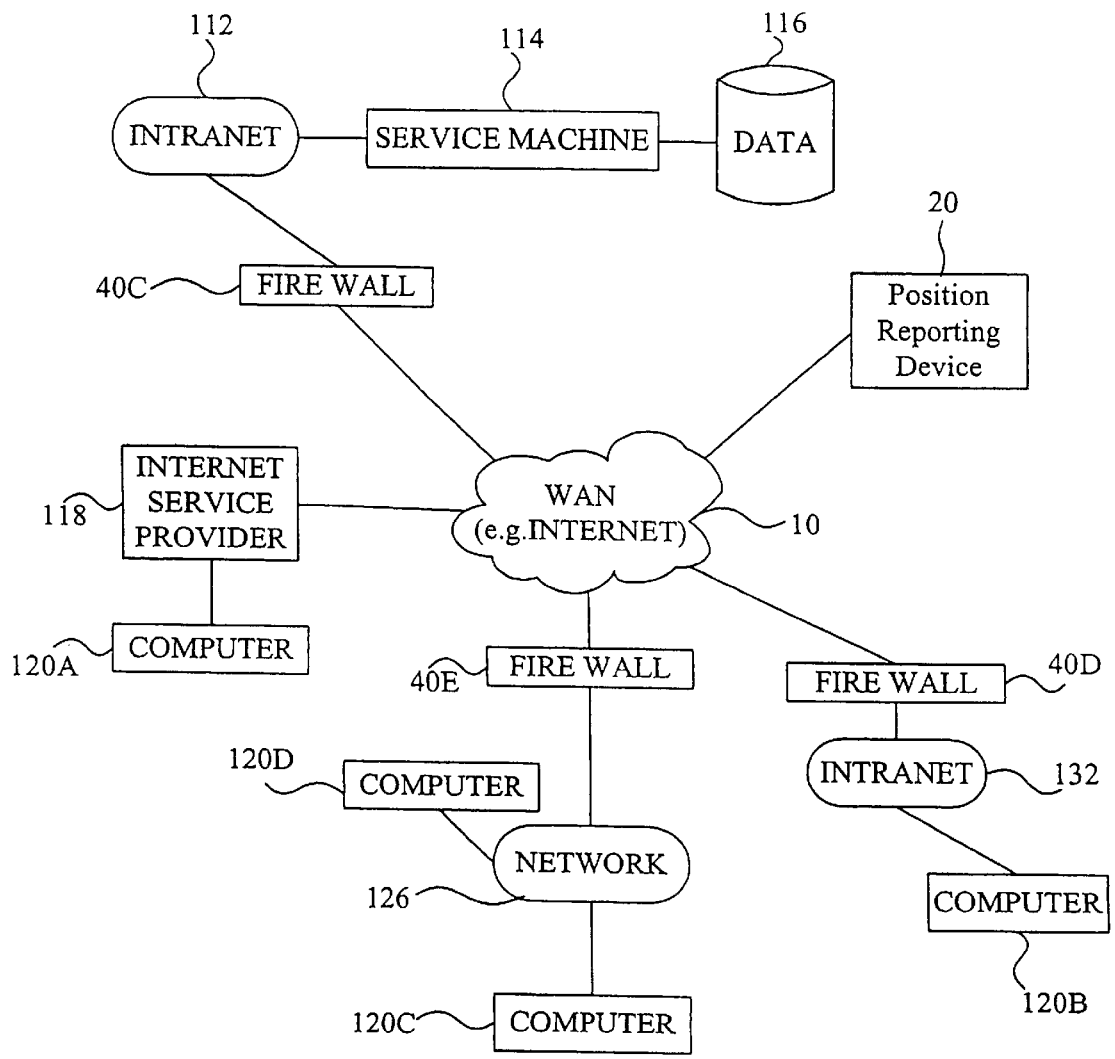
FIG. 3 illustrates an alternative system configuration in which a position reporting device is connected to various networks through a Wide Area Network (e.g., the Internet)

FIG. 3 illustrates an alternative system diagram of the present invention in which different devices and subsystems are connected to the WAN 10. However, there is no requirement to have each of these devices or subsystems as part of the invention. Each component or subsystem illustrated in FIG. 3 is individually a part of the invention. Further, the elements illustrated in FIG. 2 may be connected to the WAN 10 that are illustrated in FIG. 3. In FIG. 3, there is a position reporting device 20 that is connected to the WAN 10 via a wireless connection. Further in FIG. 3, there is illustrated a firewall 40C connected to an Intranet 112. The service machine 114 connected to the Intranet 1 12 includes therein or has connected thereto data 116 which may be stored in a database format. The data 116 may include a history of the position information of the position reporting device 20 that is being monitored. The service machine 114 may be implemented as any type of device and is preferably implemented using a computerized device such as a general-purpose computer.

An alternate type of sub-system includes the use of an Internet Service Provider (ISP) 118 that may be any type of ISP, including known commercial companies such as for example America Online, Mindspring, and Niftyserve. In this sub-system, a computer 120A is connected to the ISP 118 through a modem (e.g., an analog telephone line modem, a cable modem, an ISDN-based modem, an Asymmetric Digital Subscriber Line (ASDL)-based modem, a frame relay adapter, a wireless (e.g., radio frequency) modem, an optical modem, or a device that uses infrared light waves). The computer 120A may receive position information communicated to it by the position reporting device 20.

Also illustrated in FIG. 3 is a firewall 40E connected to a network 126. The network 126 may be implemented as any type of computer network (e.g., an Ethernet or Token-Ring network). Networking software that may be used to control the network includes any desired networking software including software commercially available from Novell or Microsoft. The network 126 may be implemented as an Intranet, if desired. Computers 120D and 120C connected to the network 126 may receive position information from the position reporting device 20. The wireless communication described herein may be established using spread spectrum techniques including techniques which use a spreading code and frequency hopping techniques such as the frequency hopping technique disclosed in the Bluetooth Specification (available at the world wide web site www.bluetooth.com), which is incorporated herein by reference.

Another sub-system illustrated in FIG. 3 includes a firewall 40D, an Intranet 132, and a computer 120B. The computer 120B may receive position information from the position reporting device 20. While FIG. 3 illustrates a plurality of firewalls, the firewalls are preferable but optional equipment and therefore the invention may be operated without the use of firewalls, if desired.

Figure 4:
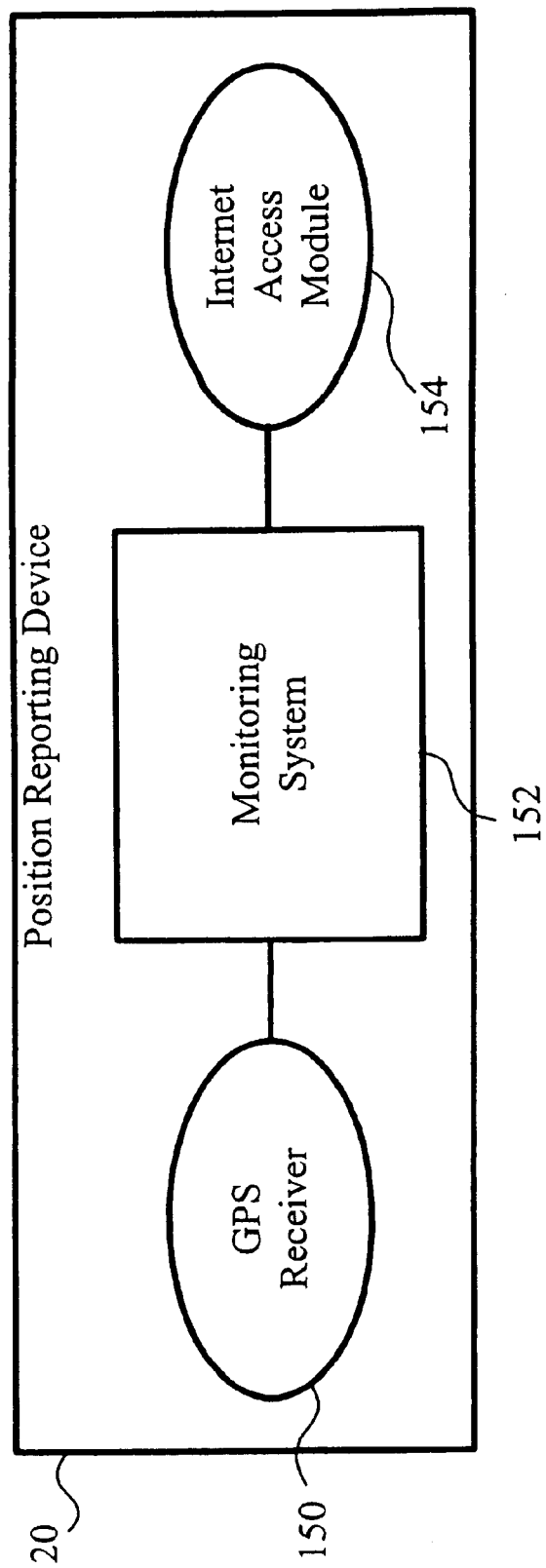
FIG. 4 illustrates components of the position reporting device according to one embodiment of the present invention.

FIG. 4 shows the components of the position reporting device 20. The position reporting device 20 contains a GPS Receiver 150. The GPS Receiver 150 obtains signals from GPS satellites or ground stations to determine its position. GPS receivers are available in the form of handheld GPS receivers, automotive GPS receivers, and fixedmount GPS receivers. Commercially available handheld GPS receivers are the Magellan GPS Blazer 12, Trimble GeoExplorer 3, and Garmin GPS 12CX HandHeld GPS. Commercially available automotive GPS receivers are the Magellan 750 Nav—Neverlost, Philips Carin GPS Navigation System, and Garmin StreetPilot Portable GPS Mapping System.

Further in FIG. 4, the position reporting device 20 contains a Monitoring System 152. The Monitoring System152 may be software (e.g., a dynamic link library (DLL)) that the GPS Receiver 150 interfaces with to record the position information. The Monitoring System 152 monitors and maintains the position information of position reporting device 20 and when triggered, the Monitoring System 152 will communicate the position information to a desired party.

The position reporting device 20 also contains a communications access module (e.g., an Internet Access Module 154). The Internet Access Module 154 interfaces with the Monitoring System 152 so that it may communicate the position information to a desired party. The Internet Access Module 154 provides wireless access to the Internet so that wireless communication can occur. As mentioned above, there are commercially available products that establish connections to the Internet using wireless communications (.e.g, Ricochet Wireless, Sprint PCS Wireless, and RCN's Blackberry Wireless Email).

Figure 5:
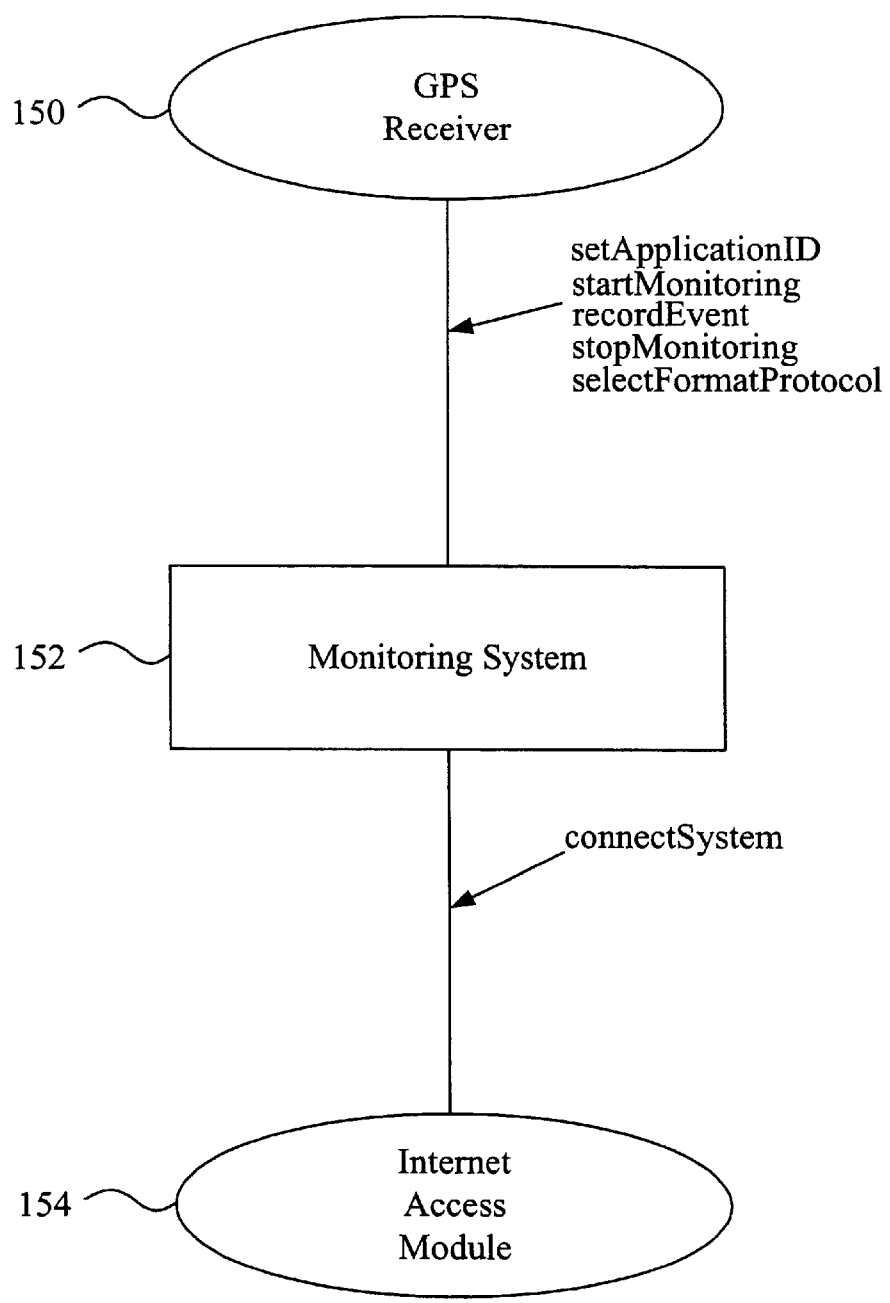
FIG. 5 shows the general architecture of the position reporting device.

FIG. 5 shows the general event management architecture of the position reporting device 20 that can be implemented as any one, or a combination of, a dynamic linked library, a script, a JAVA or C++ class, a C library routine, etc. The remainder of this discussion describes the implementation in terms of a DLL. The GPS Receiver 150 obtains information from the GPS satellites and determines its position. The position reporting device 20 may obtain its position information either periodically (e.g., every minute or every 5 minutes) or aperiodically (after five minutes, then after ten minutes, then after three minutes, etc.).

Further in FIG. 5, the Monitoring System 152 is the monitoring software or monitoring DLL that the position reporting device 20 uses to record and maintain the position information it collects. The Monitoring System 152 provides five interface functions to the GPS Receiver 150. SetApplicationID allows the GPS Receiver 150 to inform the Monitoring System 152 about the identification of the position reporting device 20. StartMonitoring allows the GPS Receiver 150 to inform the Monitoring System 152 that the monitoring system should prepare to log information about its position. StartMonitoring lets the Monitoring System 152 initialize itself before recording position information. RecordEvent allows the GPS Receiver 150 to inform the Monitoring System 152 that it should record the position information. The GPS Receiver 150 will pass information to the Monitoring System 152 about its position. The Monitoring System 152 maintains information about the position reporting device position. The Monitoring System 152 may either maintain information about its latest position or information about its position over a period of time. SelectFormatProtocol allows the GPS receiver 150 to inform the Monitoring System 152 which format and protocol to use to communicate the position information to a desired party. StopMonitoring allows the GPS receiver 150 to inform the Monitoring System 152 that it should stop recording position information. In addition to triggering the Monitoring System 152 to communicate the position information periodically, the Monitoring System 152 can be triggered to communicate the position information to a desired party when the GPS receiver 150 calls the interface function StopMonitoring.

FIG. 5 shows an Internet Access Module 154 that allows the Monitoring System 152 to communicate the position information to the desired party. The Internet Access Module 154 provides the Monitoring System 152 wireless access to the Internet so that it may use simple mail transfer protocol (SMTP) or file transfer protocol (FTP) to communicate the position information to the desired party such as the recipient in a direct search for the mobile object. The Internet Access Module 154 provides the interface function ConnectSystem to the Monitoring System 152 to provide it access to the Internet.

The Monitoring System 152 contains information about the desired party to which the position information is communicated. In one embodiment, this information is set up in the position reporting device 20 prior to attaching it to a mobile object. This setup allows the position reporting device 20 to communicate the position information to any desired party or recipient. Alternatively, the desired party can be identified after attaching the device 20 to the mobile object.

Figure 6A:
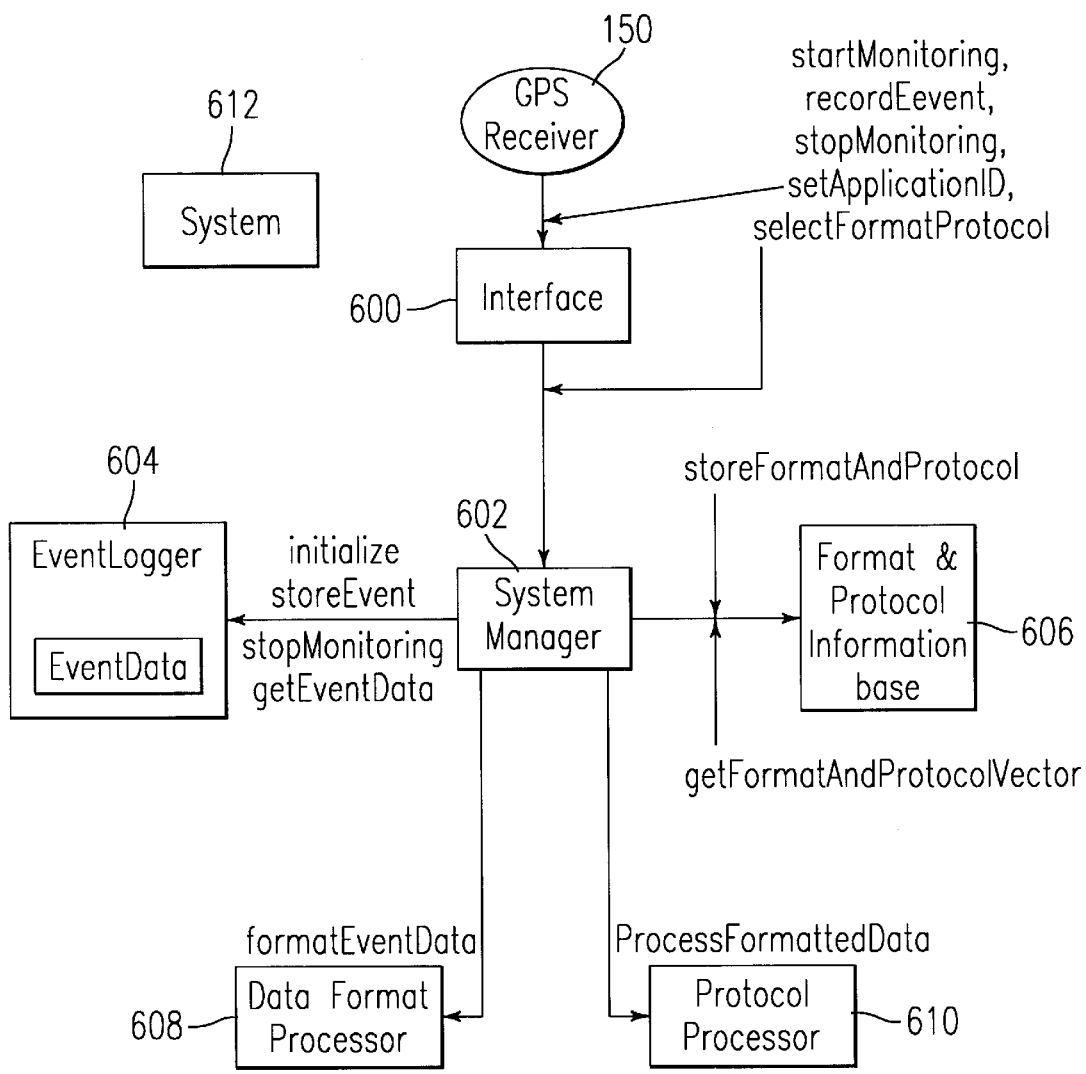
FIG. 6A shows the general architecture of the Monitoring System.

FIG. 6A shows the general event management architecture of the system that can be implemented as any one, or a combination of, a dynamic linked library (DLL), a static linked library, a script, a Java or C++ class, a C library or routine, etc. The remainder of this discussion describes the implementation in terms of a DLL. In general, a GPS receiver control application 150 communicates through an interface 600. The interface 600 specifies the Application Programming Interface (API) for the event management architecture (e.g., how position information is passed via a C or C++ function call to the object(s) in the System manager 602 with the same names). The System Manager computer code device 602 manages the behavior of other computer code devices by using appropriate objects and their functions. Similarly, the Event Logger 604 records all the necessary information such as User ID, Application ID, Cumulative Session Number, Start Time, Duration and Sequence of Events with the elapsed times when requested through the system manager 602. The Event Logger supports functions including: initialize( ), storeEvent( ), stopMonitoring( ), and getEventData( ).

The initialize function receives a string parameter for the Application ID. The System manager 602 calls this function when startMonitoring is called by the GPS receiver control application 150. The function sets the Application ID, takes care of the Cumulative number of usages, reads the clock to store the start time in order to compute the elapse time and duration, and sets up the user information by examining the registry.

After initialization, the storeEvent( ) function can be called with a string parameter for the Event passed by recordEvent. The EventLogger 604 stores the event string and the elapsed time from the start time (recorded during the initialize( ) function call).

After the application 150 has completed its usage monitoring, it calls the stopMonitoring function so that the duration can be computed. If multiple sessions are stored, this function stops the recording of a corresponding session.

The EventLogger 604 also provides access to a getEventData function. If the stopMonitoring was not previously called (i.e., the current session's duration field is undefined), the monitoring is stopped by calling the stopMonitoring function. The stopMonitoring function computes the duration of the current session. The getEventData function returns an abstract class with the access functions shown in FIG. 6B. The abstract class facilitates extensions for multiple sessions.

The Format And Protocol Information Base System 606 (implemented as any one or a combination of package, DLL, static library, etc.) stores the format and protocol information and checks the combination of formats and protocols to determine the valid combinations. To facilitate the storage process, the storeFormatAndProtocol function accepts two parameters (i.e., one for format and one for protocol). The function checks to ensure that the parameters are a valid combination.

The component 606 also includes a getFormatAndProtocolVector function returns a format and associated vector of protocols. In one embodiment, the function performs error checking. For example, if a protocol allows only one format to be sent, then the format should be the last format in the function call of selectFormatProtocol. The return value is a boolean value where true indicates that valid parameters were returned and false indicates that no more data is available. The return parameters are int and vector of int. The first int refers to the format while the vector of int refers to the vector of protocols for the format. When there is no selectFormatProtocol function call, the getFormatAndProtocolVector returns the default setting. Also would be evident, other collections (e.g., a list template) may be used in place of a vector.

The Data Format Processor 608 is responsible for formatting event data into a specified format. One exemplary function is the formatEventData function that receives a pointer to the abstract class EventData. The return value is a pointer to the abstract class FormattedEventData. Generally, interface to the FormattedEventData abstract class is defined as in FIG. 6C.

The Protocol Processor 610 is responsible for communicating the formatted event data through the specified protocol. In one embodiment, the processor 610 also encrypts the data before it is sent. To output the data, the processFormattedData function is called with an input pointer to the abstract class FormattedEventData. The function returns a boolean value where "true" represents no errors, and "false" represents the existence of an error while sending the formatted data.

The System 612 supplies important information and persistent information across the execution of the DLL. Some of the important information is timer information through the library call. The registry to keep the necessary information is another important component of the System 612. Many registry entries are set up at installation time. An exemplary structure for the registry is:

HKEY_LOCAL_MACHINE—SOFTWARE—RicohMonitor—XXX (ApplicationID)

Where XXX represents the Application ID, the following variables are placed in the registry under XXX tree: CumulativeUsage, UserID, SMTP Server, Recipients, From, FTP Server, FTP User, FTP Password, FTP Target Path etc. In one embodiment, CummulativeUsage is an integer, and the rest of the variables are strings.

Figure 7:
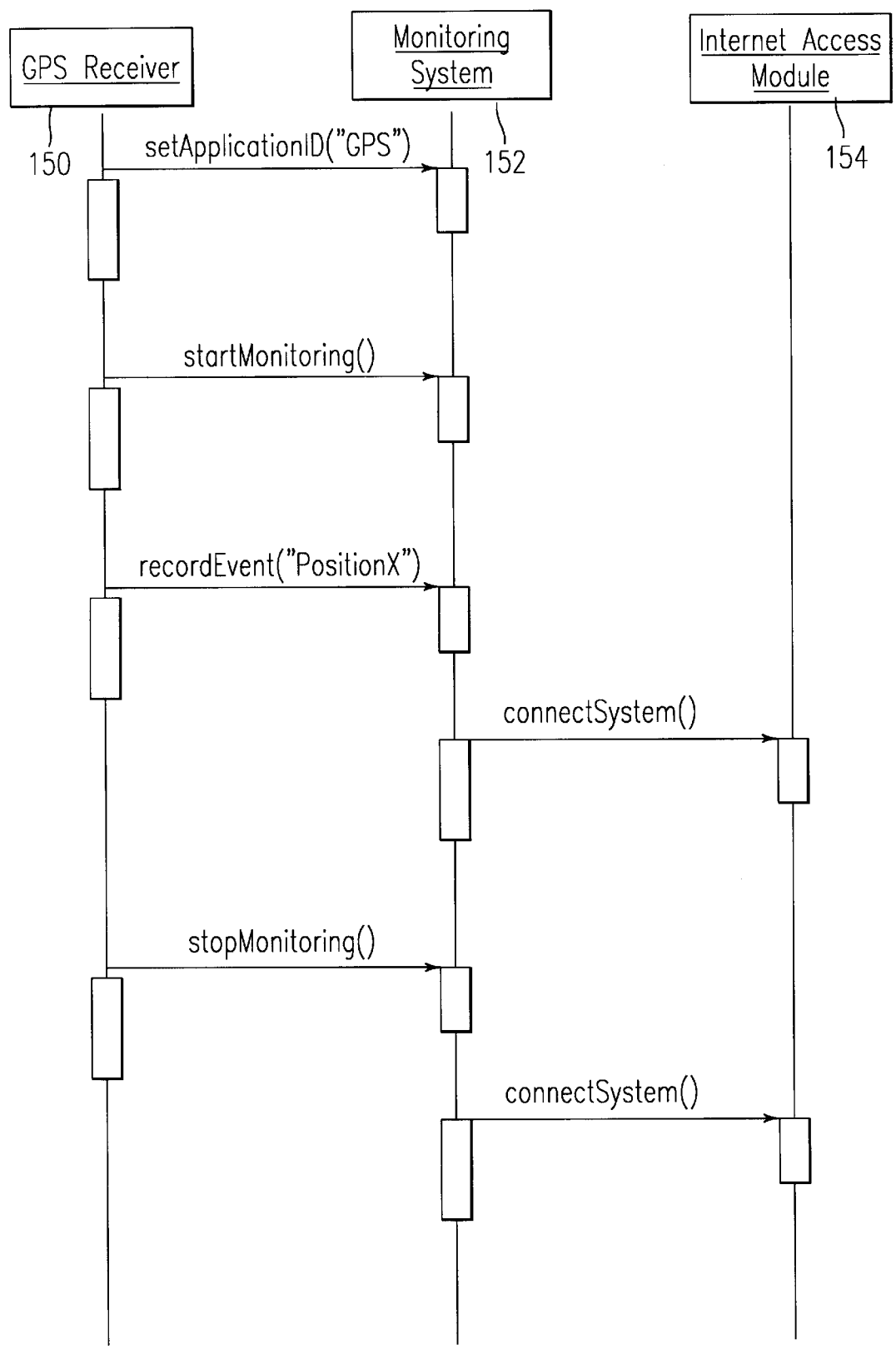
FIG. 7 shows the calling sequence of the interface functions within the position reporting device.

FIG. 7 shows an exemplary calling sequence within the position reporting device 20. The GPS receiver 150 sets the application ID through the interface function SetApplicationID of the Monitoring System. The GPS receiver 150 starts the monitoring of the position information through the interface function StartMonitoring of the Monitoring System 152. The Monitoring System 152 records and maintains start information. The GPS receiver 150 obtains position information periodically. For each occurrence, the GPS receiver 150 calls the interface function RecordEvent of the Monitoring System 152 passing the position information so that the Monitoring System 152 will keep track of the position information. The Monitoring System 152 will periodically communicate the position information by calling the interface function ConnectSystem of the Internet Access Module 154 to obtain wireless access to the Internet. This will allow the Monitoring System 152 to communicate the position information to a desired party. When the position reporting device 20 is turned off, the GPS receiver stops monitoring the position information by calling the interface function StopMonitoring of the Monitoring System 152. The Monitoring System 152 will communicate the final position information by calling the interface function ConnectSystem of the Internet Access Module 154 to obtain wireless access to the Internet and to communicate the position information to a desired party.

Figure 8:
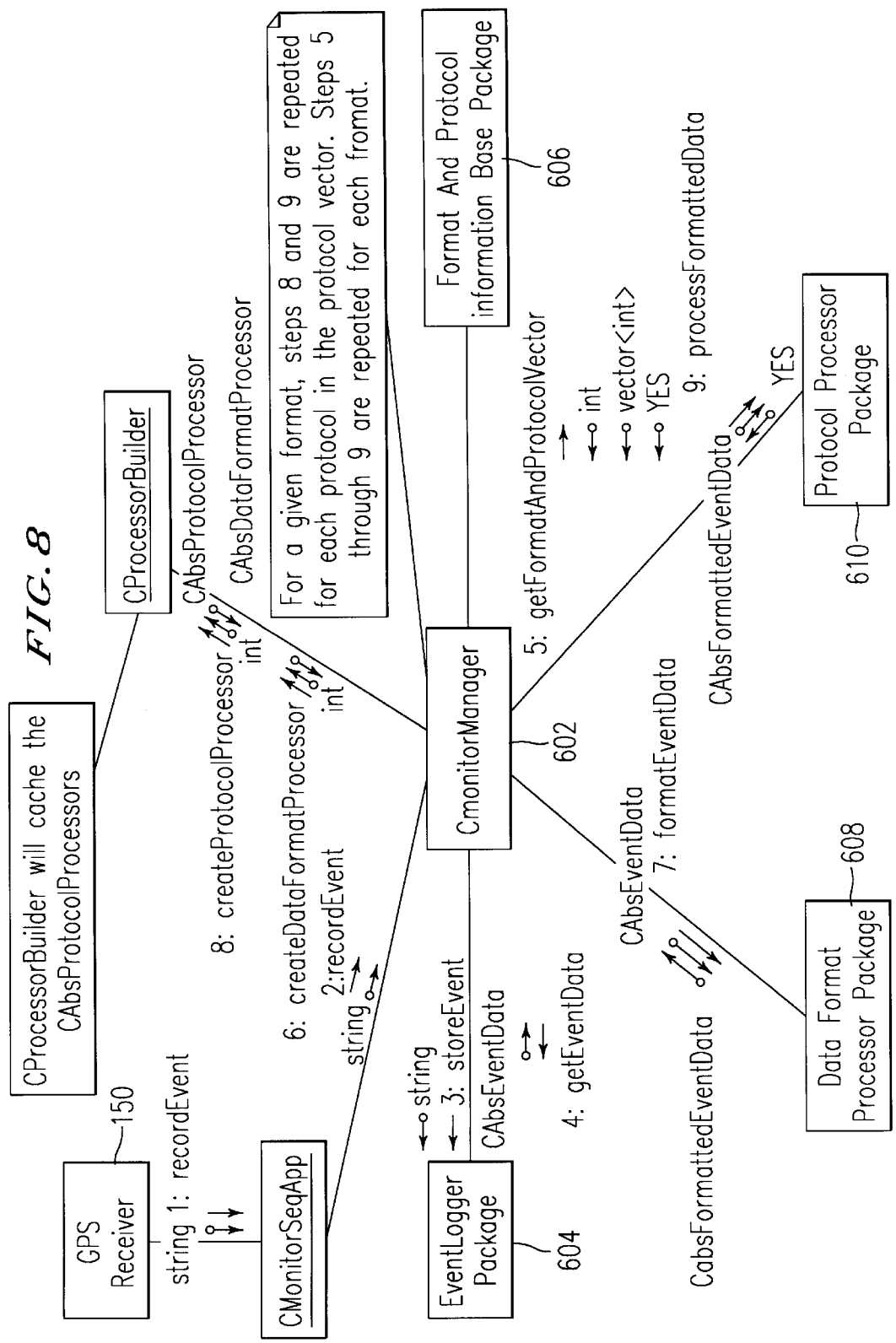
FIG. 8 shows the processing when the Monitoring System sends the monitored position information with the specified formats using the specified protocols.

FIG. 8 describes the process of sending the monitored position information. The position information is sent periodically after the position information has been collected by the Monitoring System 152. Steps 1 through 3 show the process of recording the latest position information after the GPS receiver 150 has obtained information about its location. Step 4, entitled "getEventData," shows the process of obtaining the position information in order to communicate it to the recipient or desired party. This position information may correspond to the latest position information or the position information over a period of time. The class CMonitorManager acts as the System Manager 602 and contains trigger information about when to communicate the position information. Step 5, entitled "getFormatAndProtocolVector," shows the process of obtaining the data format and communication protocol in which the position information is communicated to the desired party. Later, step 6, entitled "CreateDataFormatProcessor," creates a data formatter for the selected formatting that is used to format the position information in step 7. Step 8 obtains the protocol processor that is used to communicate the position information in step 9. Together, steps 6 and 8 show that the formatters and protocol processors can be created dynamically (i.e., only when they are needed).

Figure 9:
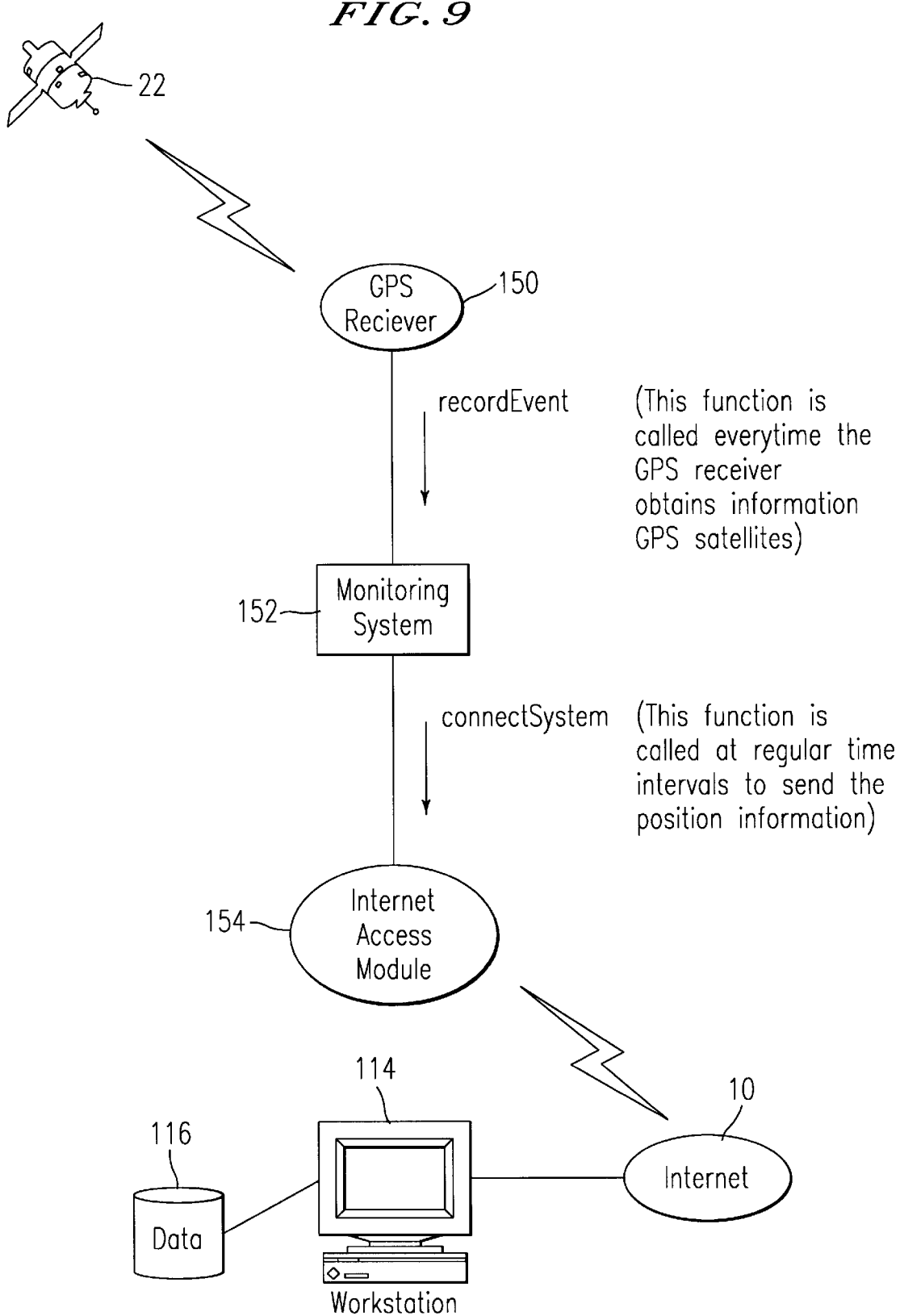
FIG. 9 shows an alternative calling sequence of the interface functions from the position reporting device.

FIG. 9 describes the use of the position reporting device 20. The GPS Receiver 150 obtains signals from GPS satellites 22. The GPS Receiver 150 determines the location of the position reporting device 20 and records the location in the Monitoring System 152 through the interface function RecordEvent. The GPS Receiver 150 obtains, determines, and records the position of the position reporting device 20 at specified times. The Monitoring System 152 will record the position information and after a time interval will communicate the position information to a desired recipient. The Monitoring System 152 will obtain wireless access to the WAN (e.g., Internet) 10 to communicate of the position information through the interface function ConnectSystem of the Internet Access Module 154. The position reporting device 20 communicates with the Internet 10 via wireless communication. The position information will be delivered to the desired recipient through the Internet 10 via email or file transfer protocol. The position information is obtained by the computer workstation 114 and may be stored on a corresponding data storage device 116 in a database.

The aforesaid methods and steps for remote position monitoring are contained according to this invention on a computer program product. The computer program product is a storage medium including instructions which can be used to program or control a computer or a plurality of networked computers to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Figure 10:
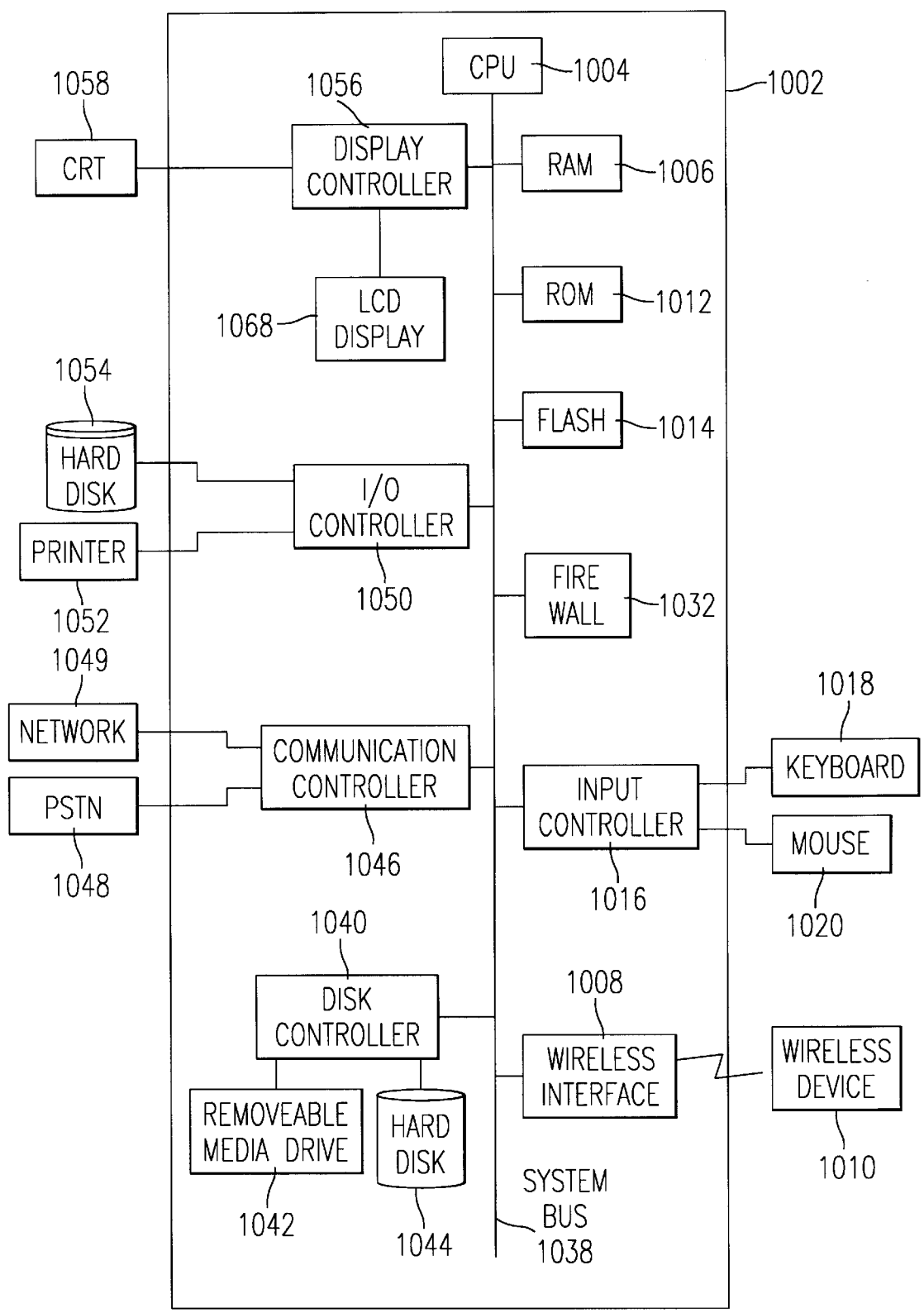
FIG. 10 illustrates the elements of an exemplary computer.

The various computers utilized by the present invention, including the computers 42 and 56A–56D of FIG. 2, may be implemented as illustrated in FIG. 10. Further, any other computer utilized by this invention may be implemented in a similar manner to the computer illustrated in FIG. 10, if desired, including the service machine 114 and computer 120C. However, not every element illustrated in FIG. 10 is required in each of those computers. In FIG. 10, the computer 1002 includes a CPU 1004 which may be implemented as any type of processor including commercially available microprocessors from companies such as Intel, AMD, Motorola, Hitachi and NEC. There is a working memory such as a RAM 1006, and a wireless interface 1008 which communicates with a wireless device 1010. The communication between the interface 1008 and device 1010 may use any wireless medium (e.g., radio waves or light waves). The radio waves may be implemented using a spread spectrum technique such as Code Division Multiple Access (CDA) communication or using a frequency hopping technique such as that disclosed in the Bluetooth specification.

There is a ROM 1012 and a flash memory 1014, although any other type of non-volatile memory (e.g., EPROM, or an EEPROM) may be utilized in addition to or in place of the flash memory 1014. An input controller 1016 has connected thereto a keyboard 1018 and a mouse 1020. There are serial and parallel interfaces (not shown) connected to serial and parallel devices (not shown). There is an IEEE 1394 device, commonly referred to as a fire wall device 1032, connected to an IEEE 1394 interface (not shown). The various elements of the computer 1002 are connected by a system bus 1038. A disk controller 1040 is connected to a floppy disk drive 1042 and a hard disk drive 1044. A communication controller 1046 allows the computer 1002 to communicate with other computers (e.g., by sending e-mail messages) over a telephone line 1048 or a network . An I/O (Input/Output) controller 1050 is connected to a printer 1052 and a hard disk 1054, for example using a SCSI (Small Computer System Interface) bus. There is also a display controller 1056 connected to a CRT (Cathode Ray Tube) 1058, although any other type of display may be used including a liquid crystal display 1068, a light emitting diode display, a plasma display, etc.

Numerous modifications and variations of the present invention are possible in light of the above teachings. It is therefore to be understood that within the scope of the appended claims, the invention may be practiced otherwise than as specifically described herein.

What is claimed is:

1. A position reporting device for attachment to a mobile object, the position reporting device comprising:
    a memory device for storing a pre-programmed, static address of a recipient;
    a receiver configured to receive location signals from at least two known locations;
    a position calculator configured to determine a position of the receiver from the received location signals; and
    a transmitter configured to transmit, across a Wide Area network, position information to the recipient specified by the pre-programmed, static address in the memory of the position reporting device.

2. The position reporting device of claim 1, wherein: the receiver and position calculator comprise a global positioning satellite receiver configured to obtain signals from global positioning satellites and to determine the position; the position reporting device further comprises a monitoring system configured to monitor and maintain the position from the global positioning satellite receiver; and the transmitter comprises an Internet access module configured to communicate the position information.

3. The position reporting device of claim 2, wherein the global positioning satellite receiver is at least one of a hand-held global positioning satellite receiver, an automotive global positioning satellite receiver, and a fixed-mount global positioning satellite receiver.

4. The position reporting device of claim 2, wherein the monitoring system comprises software configured to interface with the global positioning satellite receiver to record the position.

5. The position reporting device of claim 4, wherein the software comprises at least one of a dynamic link library, a static-linked library, a script, a JAVA class, a C++ class, and a C library routine.

6. The position reporting device of claim 2, wherein the monitoring system comprises a control interface for specifying a format and a protocol for transmitting the position information.

7. The position reporting device of claim 1, wherein the transmitter comprises a wireless transmitter.

8. The position reporting device of claim 7, wherein the wireless transmitter comprises a radio transmitter.

9. The position reporting device of claim 8, wherein the protocol comprises at least one of a store-and-forward protocol and a direct connection protocol.

10. The position reporting device of claim 8, wherein the protocol comprises at least one of a file transfer protocol and a simple mail transfer protocol.

11. The position reporting device of claim 1, wherein the mobile object comprises at least one of an individual and a vehicle.

12. The position reporting device of claim 11, wherein the vehicle comprises at least one of a bike, a car, a pair of skis, a snow board, a boat, a hang glider, a bus and a train.

13. The position reporting device of claim 11, wherein the individual comprises at least one of a hiker, a biker, an automobile passenger, a skier, a snow boarder, a boater, a hang glider, a child, and a person entering a hazardous area in which rescue time would be shortened by knowing the position of the person.

14. The position reporting device of claim 1, wherein the transmitter is further configured to transmit an identification number identifying the mobile object.

15. A monitoring system comprising:
    a monitor for receiving position information via a wide area network; and
    a position reporting device for attachment to a mobile object, the position reporting device including:
        a memory device for storing a pre-programmed, static address of a recipient;
        a receiver configured to receive location signals from at least two known locations;
        a position calculator configured to determine a position of the receiver from the received location signals;
        a selection interface for specifying at least one of a pre-programmed, static address stored in the memory of the position reporting device and a name of the monitor; and
        a transmitter configured to transmit, across the Wide Area network, position information to the monitor specified by the selection interface.

16. A method for reporting a position of a position reporting device attached to a mobile object, the method comprising the steps of:
    pre-programming a static address of a recipient in a memory of the position reporting device;
    receiving, via a receiver, location signals from at least two known locations;
    determining a position of the receiver from the received location signals; and
    transmitting, across a Wide Area network, position information to the recipient specified by the static address pre-programmed in the memory of the position reporting device.

17. The method as claimed in claim 16, wherein the receiving and determining steps are performed inside a global positioning satellite receiver, and the transmitting step comprises transmitting across the Internet.

18. The method as claimed in claim 16, wherein the step of transmitting comprises transmitting using a wireless transmitter.

19. The method as claimed in claim 16, further comprising the step of specifying a format and a protocol for transmitting the position information.

20. The method as claimed in claim 16, wherein the step of transmitting comprises transmitting using at least one of a store-and-forward protocol and a direct connection protocol.

21. The method as claimed in claim 16, wherein the step of transmitting comprises transmitting an identification number identifying the mobile object.

22. A computer program product, comprising:
    A computer storage medium and a computer program code mechanism embedded in the computer storage medium for causing a position reporting device to track position information, the computer program code mechanism comprising:
        a first computer code device configured to pre-program a static address of a recipient in a memory;
        a second computer code device configured to receive location signals from at least two known locations;
        a third computer code device configured to determine a position of the position reporting device from the received location signals; and a fourth computer code device configured to transmit, across a Wide Area network, position information to the recipient specified by the pre-programmed static address in the memory of the position reporting device.

23. The computer program product as claimed in claim 22, wherein the second computer code device receives at least three location signals from at least three known locations and the third computer code device determines a position of the position reporting device from the at least three received location signals.

* * * * *